United States Patent [19]

Ohashi et al.

[11] Patent Number: 4,472,718
[45] Date of Patent: Sep. 18, 1984

[54] TRACKING RADAR SYSTEM

[75] Inventors: Yoshimasa Ohashi; Tetsuo Kirimoto; Michimasa Kondo, all of Kamakura, Japan

[73] Assignee: Mitsubishi Denki Kabushiki Kaisha, Tokyo, Japan

[21] Appl. No.: 308,171

[22] Filed: Oct. 2, 1981

[30] Foreign Application Priority Data

Oct. 6, 1980 [JP] Japan ................................. 55-27207

[51] Int. Cl.³ .............................................. G01S 7/44
[52] U.S. Cl. ................................ 343/16 R; 343/5 NQ
[58] Field of Search ................. 343/16 R, 16 M, 5 NQ

[56] References Cited

U.S. PATENT DOCUMENTS

| 3,757,326 | 9/1973 | White | 343/16 M X |
| 3,795,913 | 3/1974 | Kosowsky et al. | 343/16 M |
| 3,827,049 | 7/1974 | van Staaden et al. | 343/16 M X |
| 3,854,135 | 12/1974 | White | 343/16 M |
| 4,034,374 | 7/1977 | Kruger | 343/16 R |
| 4,060,807 | 11/1977 | Barton | 343/16 R X |
| 4,163,975 | 8/1979 | Guilhem et al. | 343/5 NQ X |
| 4,316,191 | 2/1982 | Sawatari et al. | 343/16 R |

FOREIGN PATENT DOCUMENTS 2408843  7/1979  France ........................... 343/5 NQ

OTHER PUBLICATIONS

F. G. Willwerth and I. Kupiec, "Array Aperture Sampling Technique for Multipath Compensation", Microwave Journal, Jun. 1976, pp. 37-39.
J. E. Howard, "A Low Angle Tracking System for Fire Control Radars", IEEE Int'l Radar Conference Record 1975, pp. 412-417.
I. Kupiec, "Experimental Verification of the Performance of the Aperture Sampling Technique", Technical Note 1975-45, Lincoln Laboratory, MIT, Sep. 1975, AD-AO16 779.

Primary Examiner—T. H. Tubbesing
Attorney, Agent, or Firm—Wenderoth, Lind & Ponack

[57] ABSTRACT

A tracking radar system which includes a variable frequency oscillator for supplying to a vertical antenna array an oscillation frequency which is changed for each of a number of pulses transmitted from the antenna array. The antenna array transmits an electric wave toward a target at a low altitude and receives an echo from the target. An electronic computer estimates an elevation angle of the target from the echo received by the antenna array according to array aperture sampling technique for each pulse. An averaging circuit averages those estimated elevation angles of the target to provide its elevation angle. Alternatively, the oscillation frequency may change for each of finite time intervals.

1 Claim, 8 Drawing Figures

TRACKING RADAR SYSTEM

BACKGROUND OF THE INVENTION

This invention relates to improvements in a radar system for tracking a target at low elevation angles.

When a radar system attempts to detect targets such as aircraft entering at low altitudes, it is difficult to positively acquire the targets by the radar system unless the surface of the sea or earth above which the targets are moving is flat. This is because diffuse reflections occur on the rough surface.

In order to track targets such as aircraft at low elevation angles, the so-called array aperture sampling technique is known. According to this technique, a plurality, for example, N, antenna elements are arranged in a vertical array so as to transmit an electric wave toward a target at low elevation angles and receive an echo from the target. The echo includes a direct wave reflected from the target and a reflected wave or waves resulting from a mirror image and a diffuse reflection or reflections from the surface of the earth or sea. Thus the echo is subjected to the multipath effect.

An echo portion received by each of the antenna elements is resolved into a real and an imaginary part of a signal in the form of a complex number corresponding to that echo portion by a pair of phase detectors which are respectively supplied with sinusoidal signals in a quadrature relationship. By using those N complex signals, an electronic computer can calculate the directions of arrival of the echo such that minimum differences exist between the N complex signals and N complex outputs from the antenna elements obtained when imaginary directions of arrival of the echo whose number n is known are selected at will. Then, the direction of arrival of the direct wave has been determined by that calculated direction of arrival having a maximum elevation angle.

To determine an elevation angle of a target as described above has been disadvantageous in that an elevation tracking error is large when the surface of the earth or sea has a roughness which is large as compared with a wavelength transmitted by the antenna elements.

Accordingly, it is an object of the present invention to provide an improved radar system for tracking a target at low elevation angles with a high accuracy even in the presence of diffuse reflections from the rough surface of the earth or sea.

SUMMARY OF THE INVENTION

The present invention provides a radar system for tracking a target at low elevation angles, comprising an oscillator for changing an oscillation frequency for each of a number of pulses transmitted from the radar system or at finite time intervals, a plurality of antenna elements arranged in a vertical array so as to transmit an electric wave with the oscillation frequency from the oscillator toward a target at low elevation angles and to receive a reflected electric wave from the target, and means for deriving a plurality of signals in the form of complex numbers from the reflected electric waves received by the plurality of antenna elements one for each antenna element and for each of the transmitted pulses or of the finite time intervals. The radar system further comprises estimation means for estimating an elevation angle of the target for each of the transmitted pulses or of the finite time intervals from the plurality of signals in the form of complex numbers, and an averaging means for averaging the estimated elevation angles from the estimation means to provide an elevation angle of the target.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
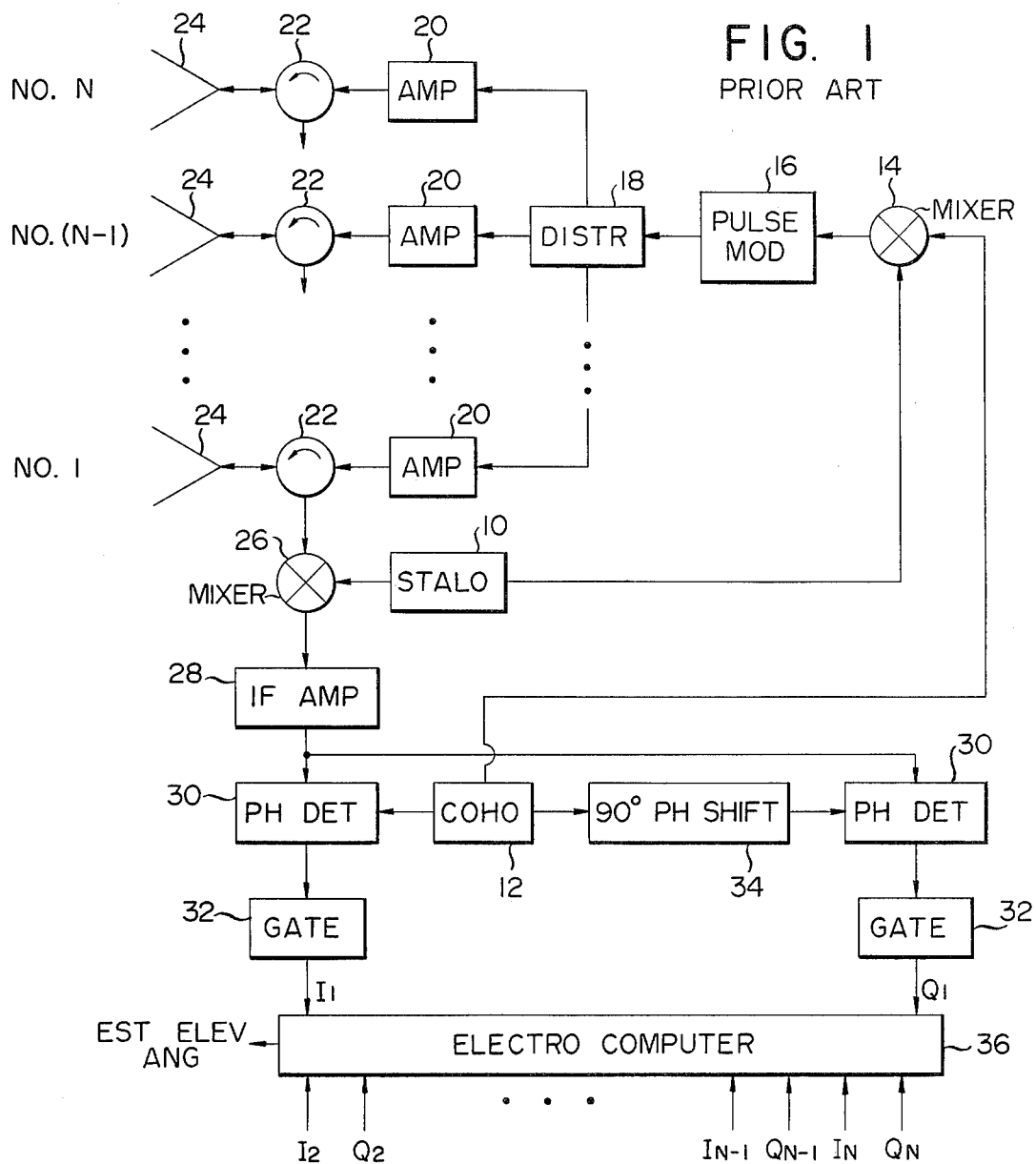
FIG. 1 is a block diagram of a conventional radar system for tracking a target at low elevation angles.

Referring now to FIG. 1 of the drawings, there is illustrated a conventional radar system for tracking a target such as an aircraft at low elevation angles. In the illustrated arrangement, one portion of a radio frequency (which is abbreviated as "RF") continuous wave from a stable local oscillator 10 is mixed with a portion of an intermediate frequency (which is abbreviated as "IF") output from a coherent oscillator 12 by a transmitting mixer 14. A mixed output from the mixer 14 is pulse-modulated by a pulse modulator 16 and then applied to a distributer 18 for equally distributing its output to a plurality of amplifiers 20. In the illustrated example, the distributor 18 is connected to the N amplifiers 20. An amplified output from each of the amplifiers 20 is applied via an associated circulator 22 to an antenna element 24 connected to the latter. In the arrangement, the N antenna elements 24 are arranged in a vertical array and transmit an electric wave toward a target such as an aircraft (not shown).

Figure 2:
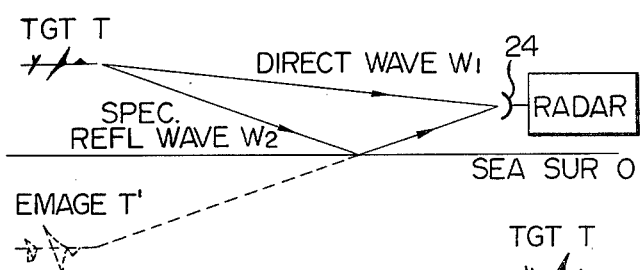
FIG. 2 is a schematic diagram illustrating the relationship between a direct electric wave reflected from a target located at a low elevation angle above the surface of the sea or earth nearly approximately a plane and a specular electric wave regarded as originating from the mirror image of the target located below that surface and arriving at a radar antenna array.
Figure 3:
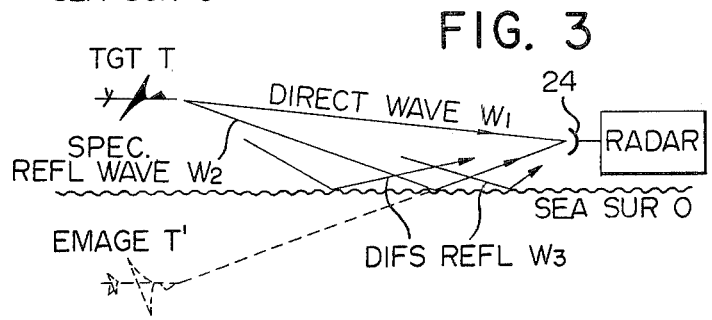
FIG. 3 is a diagram similar to FIG. 2 but illustrating the surface of the sea or earth having a roughness which is large as compared with a wavelength transmitted from a radar antenna array and reflected electric waves due to diffuse reflection on that surface.

The transmitted electric wave is reflected from the target (which is designated by the reference character T in FIGS. 2 and 3) and the reflected wave or an echo from the target T arrives at the antenna elements 24 of the vertical array. Assuming that the target T is at a low elevation angle, there is developed the so-called multipath effect that, as shown in FIG. 2 or 3, the echo from the target T includes a direct electric wave reflected from the target T and arrived directly at the N antenna elements 24 and an electric wave or waves reflected from the target T and arrived at the antenna elements 24 after having been again reflected from the surface of the earth or sea.

Each of the antenna elements 24, for example, the antenna element 24 labelled No. 1 supplies the received signal to one input to a receiving mixer 26 through the mating circulator 22. In the mixer 26, the signal is mixed with another portion of the RF continuous wave from the stable local oscillator 10 to form an IF signal which is, in turn, amplified by an IF amplifier 28. The amplified IF signal from the IF amplifier 28 is supplied to a pair of phase detectors 30. One of the phase detectors 30, in this case, the lefthand phase detector 30 as viewed in FIG. 1, mixes the IF signal with another portion of the IF continuous wave from the coherent oscillator 12 and a mixed output from that phase detector 30 is supplied to a gate circuit 32. The gate circuit 30 picks out an amplitude and a phase component of the signal from the target received by the antenna element No. 1 to form a real part $I_1$ of a signal $V_1$ in the form of a complex number corresponding to the signal received by the antenna element No. 1.

The other or righthand phase detector 30 is supplied with still another portion of the IF continuous wave from the coherent oscillator 12 through a 90° phase shifter 34 and connected to another gate circuit 32. Similarly, that gate circuit 32 picks out an amplitude and a phase component of the signal from the target received by the antenna element No. 1 to form an imaginary part $Q_1$ of the signal $V_1$ as described above.

Each of the remaining antenna elements 24 is connected via its mating circulator 22 to a circuit configuration identical to that described above although not illustrated for simplicity. Thus, the signal from the target received by each of those antenna elements 24 similarly forms a real and an imaginary part of a signal in the form of a complex number corresponding to the same at outputs of an associated pair of gate circuits such as shown at 32 in FIG. 1. For example, the signal received by the antenna element 24 labelled No. $N-1$ forms a real and an imaginary part $I_{N-1}$ and $Q_{N-1}$ of a signal $V_{N-1}$ in the form of a complex number or a complex signal $V_{N-1}$ corresponding to the same.

Then, the complex signals $V_1$, $V_2$, ..., $V_N$ thus formed are supplied to an electronic computer 36. The computer 36 uses those complex signals to effect a calculation for estimating a direction of arrival of the direct wave among the reflected waves from the target subjected to the multipath effect and arriving at the vertical array of the antenna elements 24.

More specifically, on the premise that the number n of directions in which the electric waves arrive at the antenna elements 24 of the vertical array is known, the computer 36 calculates the direction of arrival of the plane electric wave that minimizes the differences that exist between the complex signals $V_1$, $V_2$, ..., $V_N$ as described above and outputs $V_1'$, $V_2'$, ..., $V_N'$ in the form of complex numbers from the antenna elements 24 obtained when n directions of arrival of the electric wave are selected at will. Then, a direction of arrival of the direct wave has been determined by that direction of arrival thus found and including a maximum elevation angle.

The process as described above has been able to estimate extremely accurately the elevation angle of a target at a low altitude in the case of the surface of the sea or earth substantially approaches a plane as shown in FIG. 2. This is because in FIG. 2 a direct wave $W_1$ arrives at the antenna elements 24 in one direction of arrival and a reflected wave $W_2$ from the flat, smooth surface 0 of the sea or earth arrives thereat in the other direction of arrival as a result of the specular reflection from the surface 0. That reflected wave $W_2$ is regarded as originating from a mirror image T' of the target T with respect to the surface 0. Thus there are only two directions of arrival of the plane electric waves.

On the contrary, where the surface 0 of the sea or earth has a roughness large as compared with a wavelength transmitted from the antenna elements 24 as shown in FIG. 3, the antenna elements 24 receive, in addition to the direct wave $W_1$ and the reflected wave $W_2$ due to the specular reflection from the surface 0, reflected waves $W_3$ due to a diffuse reflection or reflections from the surface 0. This apparently results in an increase in number of images T' of the target T caused from the diffuse reflection or reflections. Accordingly, as the number of the images T' of the target T due to the diffuse reflection or reflections is generally unknown, a large error has been caused in estimating an elevation angle of a target.

The computer simulation has be utilized to compute errors in estimating an elevation angle of a target at low altitudes on the assumption that five antenna elements 24 are arranged in the vertical array and the direct wave from the target has a signal to noise ratio of 30 db, the noise corresponding to that occurring on an associated receiver.

Figure 4:
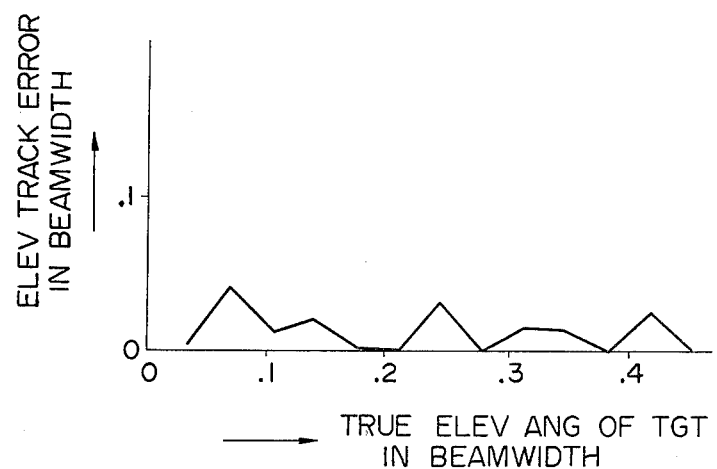
FIG. 4 is a graph illustrating an elevation tracking error occurring in the case of FIG. 2 with a conventional array aperture sampling technique used.
Figure 5:
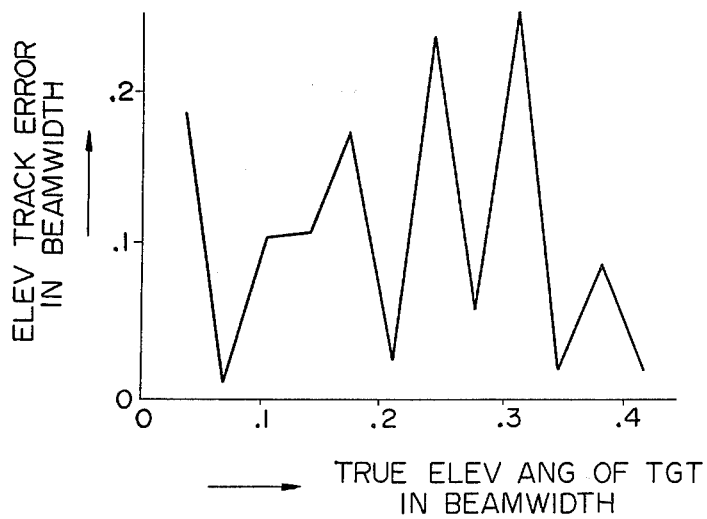
FIG. 5 is a graph similar to FIG. 4 but illustrating the presence of the diffuse reflections shown in FIG. 3.

The results of the computations are indicated in FIGS. 4 and 5 wherein the ordinate axis represents an elevation tracking error in beamwidth relative to a true elevation angle of a target and equal to the absolute value of a difference between an estimated elevation angle and the true elevation angle of the target, and the abscissa axis represents the true elevation angle of the target in beamwidth. Also, the ordinate and abscissa axes are normalized with a 3 db beamwidth of an antenna which will be formed when the N antenna elements are excited in phase. FIG. 4 shows the results of the computations with the nearly plane surface of the sea or earth as shown in FIG. 2 while FIG. 5 shows those with the rough surface of the sea or earth.

From FIG. 4 it is seen that the target has been able to be extremely accurately tracked with the nearly plane surface of the sea or earth. However, FIG. 5 offers a proof that the presence of the diffuse reflection has caused a large elevation tracking error so that the accurate tracking is not possible.

The present invention contemplates eliminating the disadvantage of the prior art practice as described above by the removal of the influence of the diffuse reflection by changing a transmitted frequency from a plurality of antenna elements arranged in a vertical array for each pulse transmitted from the antenna elements so as to cause diffuse reflection components received by the antenna elements to be decorrelated one another. Alternatively, the transmitted frequency may be changed for each of finite time intervals.

Figure 6:
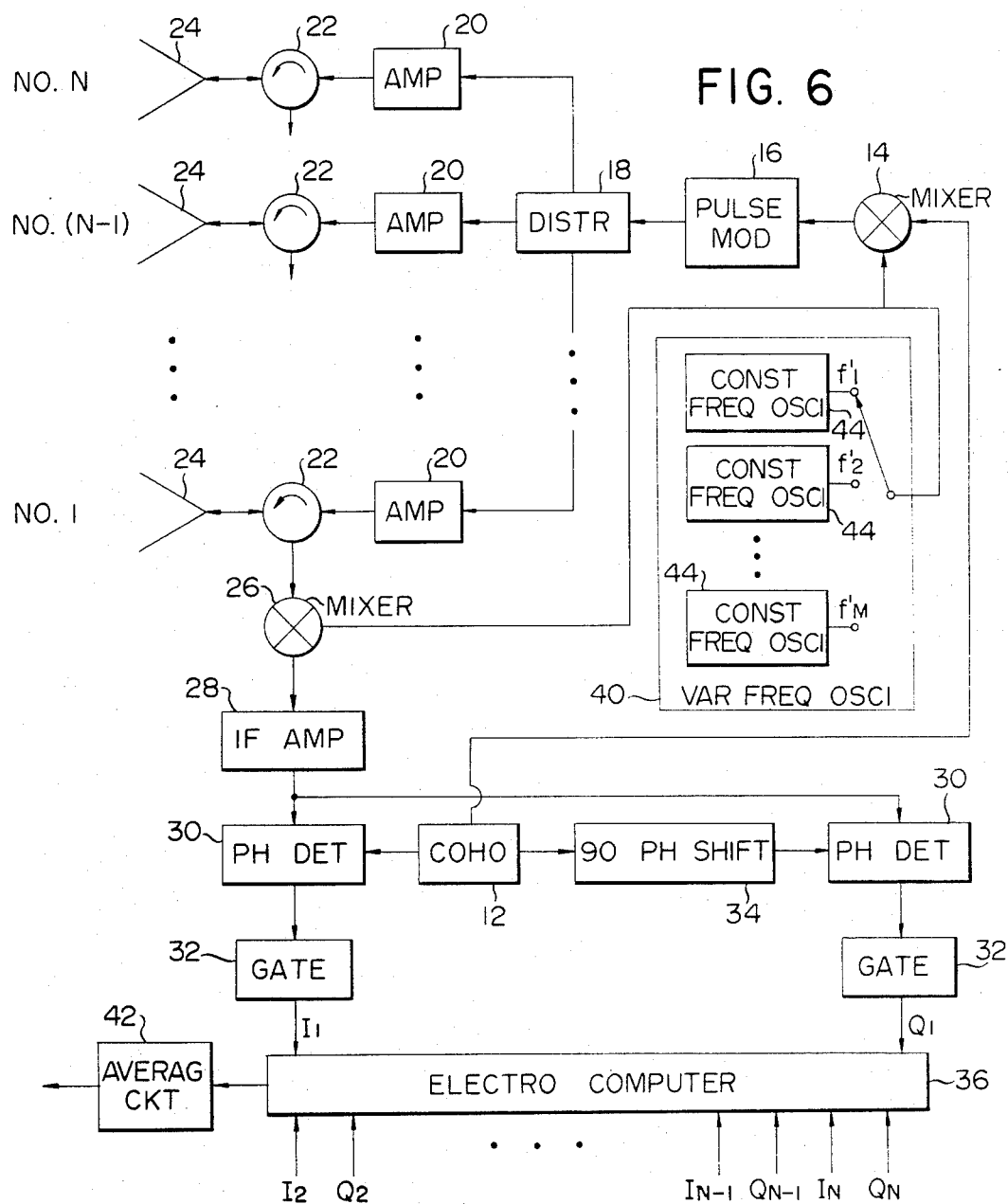
FIG. 6 is a block diagram of one embodiment according to the tracking radar system of the present invention.

Referring now to FIG. 6, wherein like reference numerals designate the components identical to those shown in FIG. 1, there is illustrated one embodiment according to the tracking radar system of the present invention. The arrangement illustrated is different from that shown in FIG. 1 only in that in FIG. 6 a variable frequency oscillator 40 is substituted for the stable local oscillator 10 shown in FIG. 1 and an averaging circuit 42 is connected to the output of the electronic computer 36. The variable frequency oscillator 40 changes its oscillation frequency and therefore a transmitted frequency from the vertical array of the antenna elements 24 either for each of pulses transmitted from the vertical antenna array or at finite time intervals.

The variable frequency oscillator 40 may be, by way of example, arranged to include M oscillators 44 for oscillating continuous waves at frequencies of $f_1'$, $f_2'$, ... $f_M'$ and to respectively deliver to the transmitting and receiving mixers 14 and 26 the frequency $f_1'$ at time point $t_1$, the frequency $f_2'$ at time point $t_2$, and so on, until delivering the frequency $f_M'$ to those mixers 14 and 26 at time point $t_M$. To this end, a switch is shown in FIG. 6 as including a movable arm for selectively connecting outputs of the M oscillators 44 to the other inputs to the mixers 14 and 26.

The variable frequency oscillator 40 successively supplies the frequencies $f_1'$, $f_2'$ ..., $f_M'$ to the transmitting mixer 14 to which the constant frequency from the coherent oscillator 12 is also supplied. Then, the mixer 14 successively supplies the frequencies $f_1'$, $f_2'$ ..., $f_M'$ mixed with the constant frequency to the vertical array of the antenna elements 24 as in the arrangement of FIG. 1. Thus, the vertical array of the antenna elements 24 successively transmits electric waves having frequencies $f_1$, $f_2$, ..., $f_M$ equal to the frequencies $f_1'$, $f_2'$, ..., $f_M'$ respectively mixed with the constant frequency from the coherent oscillator 12.

Following this, the process as described above in conjunction with FIG. 1 is repeated until an elevation angle of a target is estimated for each pulse transmitted from the antenna array 24 or each of the finite time intervals.

In the presence of the diffuse reflections due to the surface of the sea or earth having a roughness which is large as compared with the wavelength transmitted from the arrays of the antenna elements 24, as shown in FIG. 3, and when the electric wave with the frequency $f_1$ is transmitted at time point $t_1$ from the antenna array, the apparent signal-to-noise ratio decreases due to the influence of the diffuse reflections and an estimated elevation angle $\theta_1$ of a target has a deviation from a true elevation angle $\theta_T$ thereof. Subsequently, when the electric wave with the frequency $f_2$ is transmitted at the time point $t_2$ from the antenna elements 24, it is known that a diffuse reflection component or components included in an echo received by the antenna elements 24 can be approximately rendered so as to be decorrelated with that or those included in an echo received by the antenna elements 24 upon the transmission at the frequency $f_1$ at time point $t_1$ as long as the frequencies $f_1$ and $f_2$ are sufficiently different from each other. With the frequency $f_2$ set to differ sufficiently from the frequency $f_1$, the resulting estimated elevation angle $\theta_2$ of the target has a deviation from the true angle $\theta_T$ thereof which is different from the deviation of the estimated elevation angle $\theta_1$ from the true elevation angle $\theta_T$ of the target.

Figure 7:
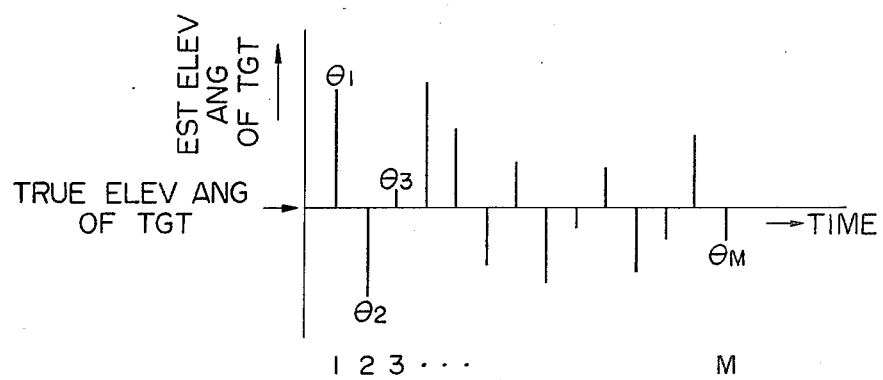
FIG. 7 is a graph illustrating estimated elevation angles of a target and developed in the arrangement shown in FIG. 6 in the presence of diffuse reflections such as shown in FIG. 3 plotted against time.

Then, the successive transmissions of the electric waves at the frequencies $f_3$, $f_4$, ..., $f_M$ at time points $t_3$, $t_4$, ..., $t_M$ successively result in estimated elevation angles $\theta_3$, $\theta_4$, ..., $\theta_M$ of the target. Deviations of those estimated elevation angles from the true elevation angle $\theta_T$ of the target are approximately random. The estimated elevation angles of the target vary with a change in time as shown in FIG. 7 wherein the estimated elevation angles of the target relative to the true elevation angle thereof are plotted on the ordinate against time plotted on the abscissa. It is noted that in FIG. 7, the estimated elevation angles $\theta_1$, $\theta_2$, ..., $\theta_N$ of the target are shown as differences between the same and the true elevation angle of the target at time points $t_1$, $t_2$, ..., $t_M$ distributed at equal time intervals on the abscissas axis.

Then, the electronic computer 36 supplies those M estimated elevation angles of the target to the averaging circuit 42 which, in turn, provides the mean value thereof as expressed by:

$$(\theta_1 + \theta_2 + \ldots, +\theta_M)/M \quad (1)$$

That mean value has a variance approximately equal to a fraction of M of that of a random variable having $\theta_1$, $\theta_2$, ..., $\theta_M$ as sampled values and also provides the true elevation angle of the target.

Figure 8:
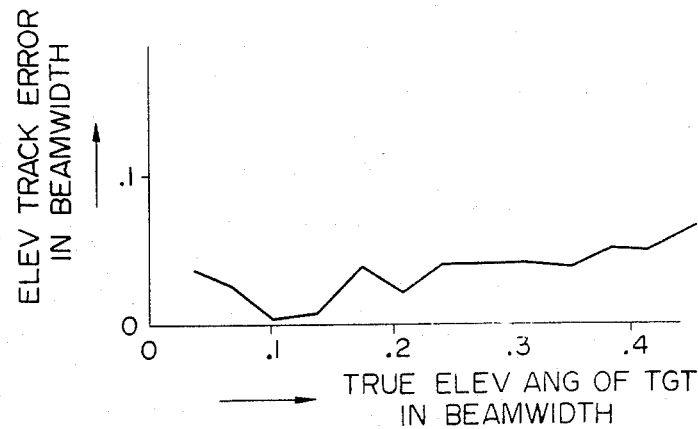
FIG. 8 is a graph illustrating elevation tracking errors occurring on the arrangement shown in FIG. 6 in the presence of diffuse reflections as shown in FIG. 3.

The elevation angle of the target given by the expression (1) is increased in accuracy as compared with the conventional array aperture sampling technique as described above in conjunction with the arrangement of FIG. 1 as will readily confirmed by the following description:

In order to confirm the increase in accuracy as described above, a computer simulation has been effected with the conditions remaining unchanged from those for the computer simulation effected in conjunction with FIG. 5 excepting that the transmitted frequency is varied and on the assumption that M in the expression (1) is equal to 100. FIG. 8 shows the resulting elevation tracking error plotted on the ordinate against the true elevation angle of the target plotted on the abscissa. As in FIG. 5, the elevation tracking error is equal to the absolute value of a difference between the estimated and true elevation angles of the target.

From the comparison of FIG. 8 with FIG. 5 it is seen that, even in the presence of diffuse reflections, the present invention can decrease the elevation tracking error and increase the accuracy of the estimated elevation angle to permit the target to be accurately tracked.

In summary, the present invention provides a radar system for tracking a target at low elevation angles comprising means for varying a transmitted frequency for each of transmitted pulses or of finite time intervals to cause diffuse reflection components received by the radar system to be decorrelated with one another and averaging means for averaging elevation angles of the target estimated for each of the transmitted pulses or of the finite time intervals to decrease a variance of the estimated elevation angles. Therefore, the elevation angle of the target can be estimated with an increased accuracy thereby to permit the accurate tracking of the target.

While the present invention has been illustrated and described in conjunction with a single preferred embodiment thereof, it is to be understood that numerous changes and modifications may be resorted to without departing from the spirit and scope of the present invention.

What is claimed is:

1. A radar system for tracking a target at low elevation angles, comprising an oscillator for changing an oscillation frequency stepwise with time, a plurality of antenna elements arranged in a vertical array to transmit successively electric wave with said changed oscillation frequencies from said oscillator toward a target at low elevation angles and receive successively said electric waves reflected from said target, deriving means for deriving a plurality of signals in the form of complex numbers from portions of said reflected electric wave received by said plurality of antenna elements respectively and for each of changes in oscillation frequency from said oscillator, estimation means estimating an elevation angle of the target from said plurality of signals in the form of complex numbers for each of said changes in oscillation frequency, and averaging means for averaging said estimated elevation angles of the target from said estimation means to provide an elevation angle of the target.

* * * * *